United States Patent
Lee et al.

(10) Patent No.: US 9,642,203 B2
(45) Date of Patent: May 2, 2017

(54) CONTROLLING DIMMING RATIO AND OUTPUT RIPPLE VOLTAGE

(71) Applicant: Allegro Microsystems, LLC, Worcester, MA (US)

(72) Inventors: Nai-Chi Lee, Nashua, NH (US); Pranav Raval, Nashua, NH (US)

(73) Assignee: Allegro Microsystems, LLC, Worcester, MA (US)

( * ) Notice: Subject to any disclaimer, the term of this patent is extended or adjusted under 35 U.S.C. 154(b) by 0 days.

(21) Appl. No.: 15/175,117

(22) Filed: Jun. 7, 2016

(65) Prior Publication Data

US 2016/0366742 A1    Dec. 15, 2016

Related U.S. Application Data

(60) Provisional application No. 62/174,847, filed on Jun. 12, 2015.

(51) Int. Cl.
*H05B 37/02* (2006.01)
*H05B 33/08* (2006.01)

(52) U.S. Cl.
CPC ....... *H05B 33/0845* (2013.01); *H05B 33/083* (2013.01); *H05B 33/0815* (2013.01)

(58) Field of Classification Search
CPC .. H05B 37/02; H05B 33/0815; H05B 33/083; H05B 37/0281
USPC ........................................................ 315/291
See application file for complete search history.

(56) References Cited

U.S. PATENT DOCUMENTS

| | | |
|---|---|---|
| 6,982,527 B2 | 1/2006 | Lee et al. |
| 7,675,245 B2 | 3/2010 | Szczeszynski et al. |
| 7,999,487 B2 | 8/2011 | Szczeszynski |
| 8,169,161 B2 | 5/2012 | Szczeszynski et al. |
| 8,274,238 B2 | 9/2012 | Szczeszynski et al. |
| 8,339,049 B2 | 12/2012 | Kang et al. |
| 8,456,105 B2 | 6/2013 | Wang et al. |
| 8,482,225 B2 | 7/2013 | Szczeszynski |
| 8,519,630 B2 | 8/2013 | Wang et al. |
| 8,664,930 B2 | 3/2014 | Kang et al. |
| 8,742,682 B1 | 6/2014 | Wang et al. |
| 8,901,835 B2 | 12/2014 | Kang et al. |

(Continued)

FOREIGN PATENT DOCUMENTS

| | | |
|---|---|---|
| EP | 2 760 255 A1 | 7/2014 |
| WO | WO 2008/086050 A2 | 7/2008 |

(Continued)

OTHER PUBLICATIONS

Office Action dated Sep. 1, 2016 for U.S. Appl. No. 14/013,306; 9 pages.

(Continued)

*Primary Examiner* — Don Le
(74) *Attorney, Agent, or Firm* — Daly, Crowley, Mofford & Durkee, LLP (57) ABSTRACT

In one aspect, an integrated circuit (IC) is configured to receive an input signal. The IC includes a boost switch driver configured to provide a switching operation to a boost converter to drive a string of light emitting diodes (LEDs), a current sink driver connected to a current source and configured to provide a current signal to the string of LEDs, and a delay module configured to delay the current signal to the string of LEDs with respect to the input signal.

20 Claims, 4 Drawing Sheets

(56) References Cited

U.S. PATENT DOCUMENTS

| | | |
|---|---|---|
| 8,937,433 B1 | 1/2015 | Wang et al. |
| 8,957,607 B2 | 2/2015 | Raval et al. |
| 8,994,279 B2 | 3/2015 | Raval et al. |
| 9,144,126 B2 | 9/2015 | Raval et al. |
| 9,155,156 B2 | 10/2015 | Szczeszynski |
| 9,265,104 B2 | 2/2016 | Szczeszynski et al. |
| 2012/0146541 A1 | 6/2012 | Szczeszynski et al. |
| 2012/0181939 A1 | 7/2012 | Szczeszynski et al. |
| 2013/0009556 A1 | 1/2013 | Szczeszynski et al. |
| 2013/0009557 A1 | 1/2013 | Szczeszynski |
| 2013/0026951 A1 | 1/2013 | Li |
| 2013/0162152 A1 | 6/2013 | Lee et al. |
| 2014/0292220 A1* | 10/2014 | Trattler ............... H02M 3/157 315/287 |
| 2015/0061528 A1 | 3/2015 | Raval et al. |
| 2015/0216009 A1* | 7/2015 | Lee .................. H05B 33/0845 315/307 |

FOREIGN PATENT DOCUMENTS

| | | |
|---|---|---|
| WO | WO 2008/086050 A3 | 7/2008 |
| WO | WO 2009/064682 A2 | 5/2009 |
| WO | WO 2009/064682 A3 | 5/2009 |
| WO | WO 2012/082365 A1 | 6/2012 |
| WO | WO 2012/148632 A1 | 11/2012 |
| WO | WO 2013/006272 A1 | 1/2013 |
| WO | WO 2013/006304 A1 | 1/2013 |
| WO | WO 2013/095769 A1 | 6/2013 |
| WO | WO 2014/031300 A1 | 2/2014 |
| WO | WO 2014/031301 A1 | 2/2014 |
| WO | WO 2014/031301 A8 | 2/2014 |

OTHER PUBLICATIONS

U.S. Office Action dated Dec. 18, 2015 corresponding to U.S. Appl. No. 14/013,306; 10 Pages.

Response to U.S. Office Action dated Dec. 18, 2015 corresponding to U.S. Appl. No. 14/013,306; Response filed on Jan. 29, 2016; 15 Pages.

A8500 Data Sheet; "Flexible WLED/RGB Backlight Driver for Medium Size LCDs;" Allegro MicroSystems, LLC; 16 Pages.

A8501 Data Sheet; "2 MHz, 4 Channel X 100 mA WLED/RGB Driver with Output Disconnect;" Revision No. 4; Allegro MicroSystems, LLC; 24 Pages.

A8502 Data Sheet; "Wide Input Voltage Range, High Efficiency Fault Tolerant LED Driver;" Revision No. 3; Allegro MicroSystems,LLC; 35 Pages.

A8503 Data Sheet; "High Efficiency 6-Channel, 2 MHz, WLED/ RGB Driver for Medium Displays, with Integrated 55 V Power Switch;" Allegro MicroSystems, LLC; 17 Pages.

A8504 Data Sheet; "WLED/RGB Backlight Driver for Medium Size LCDs;" Revision No. 3; Allegro MicroSystems, LLC; 18 Pages.

A8507 Data Sheet; "LED Backlight Driver for LCD Monitors and Televisions;" Revision No. 2; Allegro MicroSystems, LLC; 16 Pages.

A8508 Data Sheet; "Wide Input Voltage Range, High Efficiency 8-Channel Fault Tolerant LED Driver;" Revision No. 1; Allegro MicroSystems, LLC; 28 Pages.

A8517 Data Sheet; "Wide Input Voltage, Fault Tolerant, Independently Controlled Multi-Channel LED Driver with I²C interface;" Allegro MicroSystems, LLC; 63 Pages.

MAX16838; "Integrated, 2-Channel, High-Brightness LED Driver with High-Voltage Boost and SEPIC Controller;" MAXIM; 19-4972; Revision No. 2; Apr. 2011; 21 Pages.

MP3394; "Step-up, 4-String Max 200mA/String White LED Driver;" MPS; Revision No. 1.07; Mar. 21, 2013; 17 Pages.

Notice of Allowance dated Jan. 23, 2017 for U.S. Appl. No. 14/013,306, 7 pages.

Response to Office Action filed on Nov. 23, 2016 for U.S. Appl. No. 14/013,306, 15 pages.

\* cited by examiner

CONTROLLING DIMMING RATIO AND OUTPUT RIPPLE VOLTAGE

RELATED APPLICATIONS

This application claims the benefit of U.S. Provisional Application No. 62/174,847, filed Jun. 12, 2015, and entitled "CONTROLLING DIMMING RATIO AND OUTPUT RIPPLE VOLTAGE," which is incorporated herein by reference in its entirety.

BACKGROUND

Light emitting diode (LED) driver circuits are often called upon to drive a number of series connected strings of diodes simultaneously. The strings of diodes (or "LED channels") may be operated in parallel, with a common voltage node supplying all of the strings. A DC-DC converter (e.g., a boost converter, a buck converter and so forth) may be employed by the LED driver circuit to maintain a regulated voltage level on the various LED channels during operation so that all LED channels have adequate operational power. Feedback from the LED channels may be used to control the DC-DC converter. To reduce unnecessary power consumption, it may be desirable to keep the regulated voltage level on the voltage node to a minimum or near minimum, while still providing adequate power to all channels. One commonly used technique to adjust the brightness from LED string is to rapidly turn on/off the LED current using a PWM (pulsed width modulation) dimming signal. The average luminous output is thus proportional to the duty cycle of the PWM dimming signal.

SUMMARY

In one aspect, an integrated circuit (IC) is configured to receive an input signal. The IC includes a boost switch driver configured to provide a switching operation to a boost converter to drive a string of light emitting diodes (LEDs), a current sink driver connected to a current source and configured to provide a current signal to the string of LEDs, and a delay module configured to delay the current signal to the string of LEDs with respect to the input signal.

In another aspect, an integrated circuit (IC) is configured to receive an input signal. The IC includes a boost switch driver configured to provide a switching operation to a boost converter to drive a load, a current sink driver connected to a current source and configured to provide a current signal to the load, and a delay module configured to delay the current signal to the load with respect to the input signal.

DESCRIPTION OF THE DRAWINGS

The foregoing features of the invention, as well as the invention itself may be more fully understood from the following detailed description of the drawings, in which.

DETAIL DESCRIPTION

In the area of light emitting diode (LED) drivers there is an ever-increasing pressure to increase a pulse width modulation (PWM) dimming ratio beyond 10,000:1, or to reduce the PWM on-time under one microsecond. During extremely short PWM on-time, it becomes difficult for the inductor current to ramp up to a steady state value, because inductor current takes several switching cycles to reach its steady state. Load current is supplied by an output capacitor initially, so that the output voltage dips. This can cause a loss of regulation, a large output ripple and possibly audible noise from output ceramic capacitors. Described herein are techniques to control LED drivers to achieve a higher PWM dimming ratio, and to reduce output ripple. This is done by adding a 'pre-emptive boost' period (i.e., a time delay $t_D$) before the LED current is turned on. In some examples, the pre-emptive boost period may be fixed, predictive, reactive or adaptive. The techniques described herein may be applied to other loads than LEDs. The techniques described herein may be applied to power converters in general (such as Buck, Buck-Boost, SEPIC, Fly-back and so forth), to enable faster transient response to a step increase in load current.

The 'pre-emptive boost' technique described herein is not limited to LED drivers, but may be suitable for other applications where a sudden load change is applied and the demand is predictable (i.e., not a random demand from the load). In one particular example, the 'pre-emptive boost' technique may be used in a CPU power supply, because of the predictable load increase when the computer wakes up from low-power standby mode into full-power operation mode.

Figure 1:
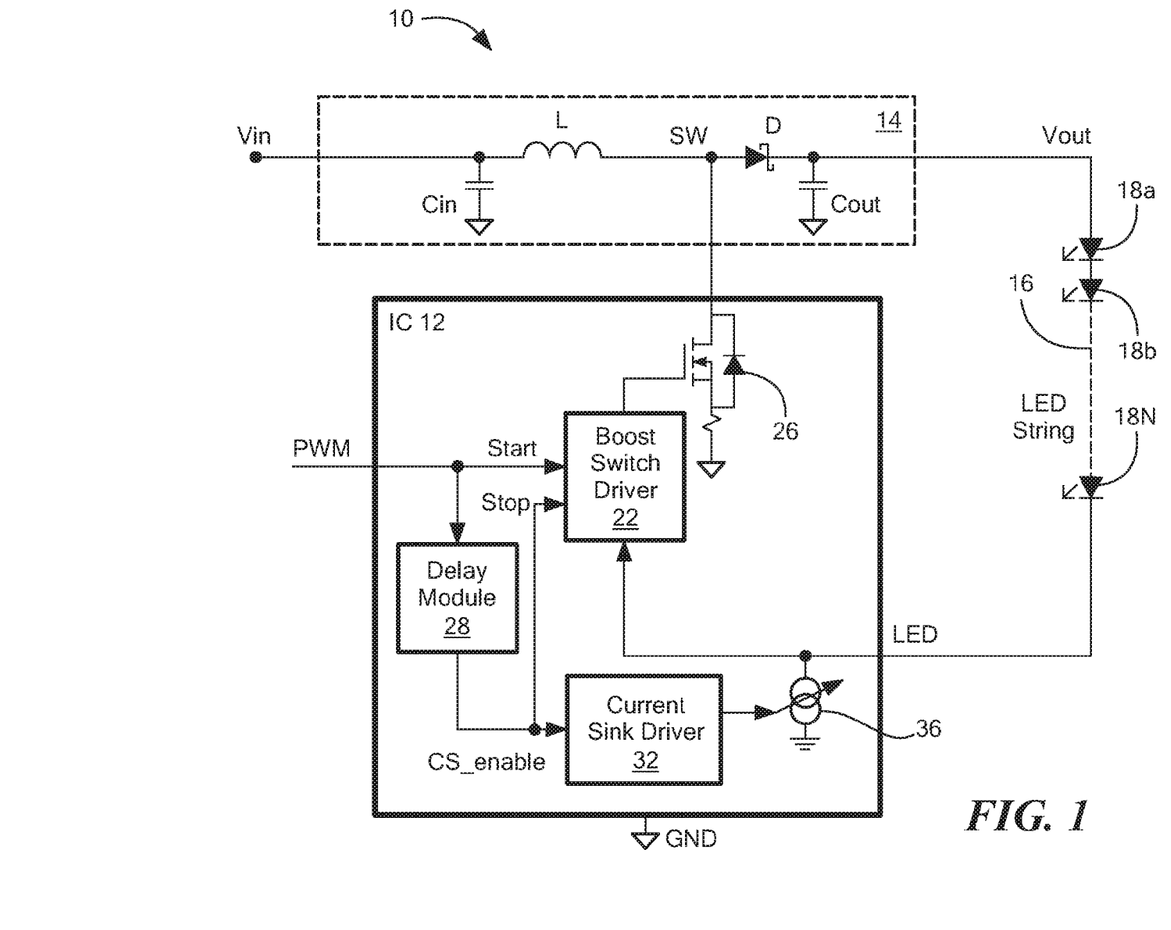
FIG. 1 is a schematic diagram of an example of a light emitting diode (LED) driver system.

FIG. 1 is a schematic diagram illustrating an example, of a light emitting diode (LED) driver system 10 that includes an integrated circuit (IC) 12, a string 16 of LEDs (e.g., an LED 18a, an LED 18b, . . . , and an LED 18N) and a boost converter 14. The boost converter 14 includes an input capacitance, Cin; an inductor, L; a diode, D and an output capacitance Cout. The IC 12 includes a boost switch driver 22, a switch 26 (e.g., a MOSFET switch), a delay module 28, a current sink driver 32 and a current source 36. A node SW couples the inductor L, the diode D and the switch 26.

The IC 12 is used to drive the string 16 of LEDs 18a-18N and to provide a dimming function to the LEDs. In particular, the boost control driver 22 provides a switching operation and the current sink driver 32 provides a dimming operation. In one example, switching is performed at a high frequency of 100 kHz to 2 MHz and the dimming operation is performed at low frequency of 100 Hz to 2 kHz.

While the illustrated arrangement includes multiple LEDs 18a-18N connected in series in a single string 16, in other configurations, the driver system 10 may drive a single LED, multiple parallel-connected LEDs, multiple strings of LEDs connected in parallel, or some combination of the above.

The boost converter 14 is a DC-DC voltage converter that is used to convert a direct current (DC) input voltage Vin to a DC output voltage Vout for use in driving the LEDs 18a-18N. As is well known, a boost converter 14 is a form of switching regulator that utilizes switching techniques and energy storage elements to generate a desired output voltage. Other types of DC-DC converters may alternatively be used.

In the arrangement shown in FIG. 1, the IC 12 is implemented as an integrated circuit (IC) and the boost converter 14 is implemented outside the IC using discrete components. It should be appreciated, however, that many alternative arrangements are possible including fully integrated implementations, fully discrete implementations, or some other combination of integrated and discrete components.

As shown in FIG. 1, the IC 12 may include boost switch driver 22 for use in controlling the operation of boost converter 14. In general, the boost converter 14 and the boost controller 22 will operate together to regulate a voltage associated with the LED(s) 18a-18N.

As described above, the boost converter 14 is operative for converting a DC input voltage VIN to a DC output voltage VOUT that is adequate to supply the LED(s) 16. The operating principles of boost converters and other types of DC-DC converters are well known in the art. During operation, the boost switch driver 22 provides a switching signal to a switching node SW of the boost converter 14. The switching signal draws current from the switching node SW at a controlled duty cycle to regulate a voltage associated with the LED(s) 16 in a closed loop manner. It should be understood that the duty cycle used to control the boost converter 14 is a different parameter from the dimming duty cycle used to adjust the illumination intensity of the LED(s) 16. In the illustrated embodiment, the boost converter 14 includes an inductor 30, a diode 32, and a capacitor 34 coupled together in a specific configuration. Other converter architectures may alternatively be used. To control the duty cycle of the boost converter 14, the boost switch driver 22 uses feedback from the LED(s) 18a-18N.

The delay module 28 is configured to delay (or time-shift) the "on time" of the LED current (denoted as LED in FIG. 1) with respect to the "on-time" of the PWM.

Figure 2:
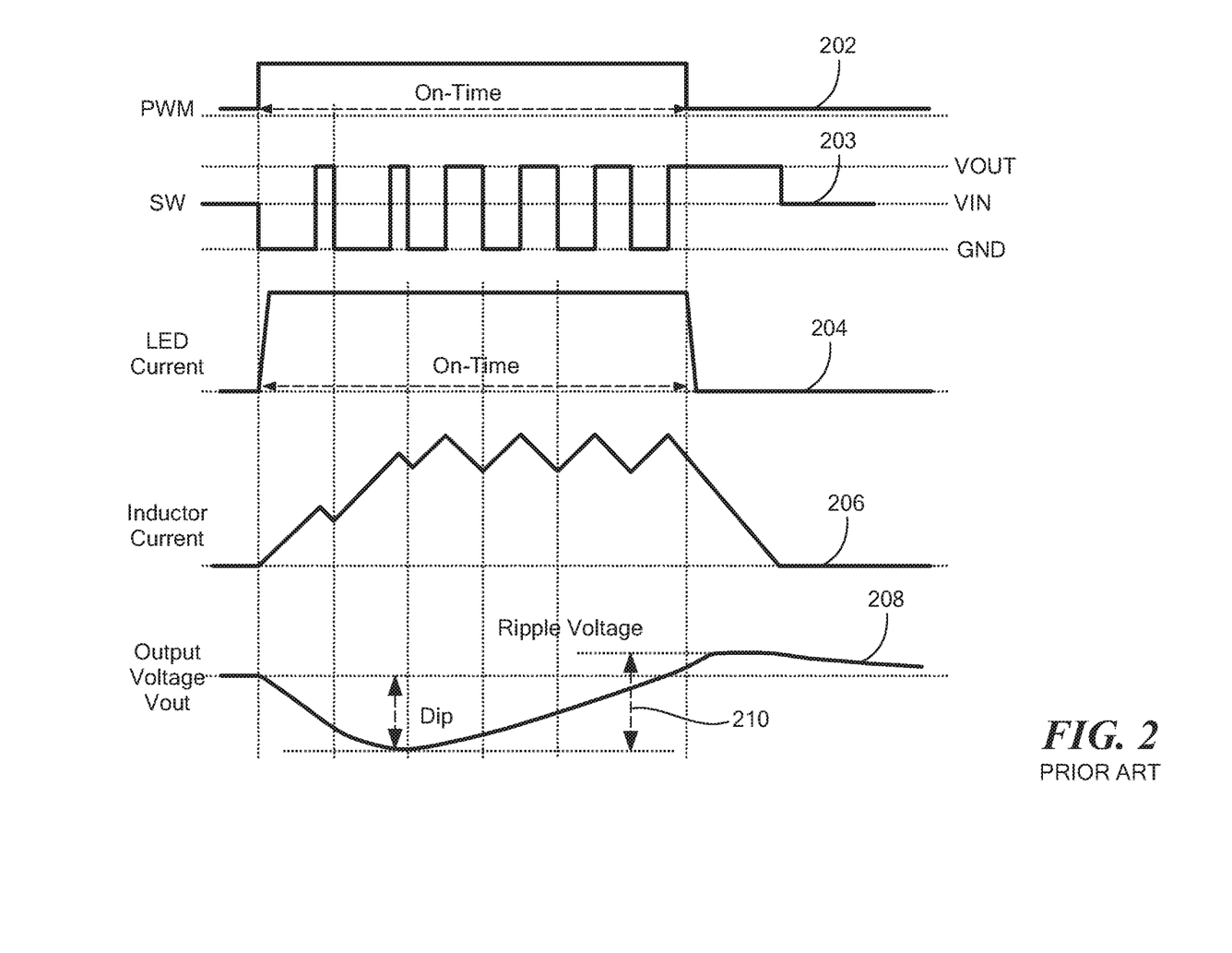
FIG. 2 is a graph depicting waveforms without using a time delay module.

Referring to FIG. 2, without the delay module 28, the input signal PWM waveform 202 is in time synch with the LED current waveform 204, which results in an inductor current waveform 206 through the inductor L, which does not achieve steady state and results in an output voltage, Vout, waveform 208. The output voltage waveform 208 defines a ripple voltage 210 measured from the valley to the peak of the output voltage waveform 208. The voltage at the node SW is the waveform 203.

Figure 3:
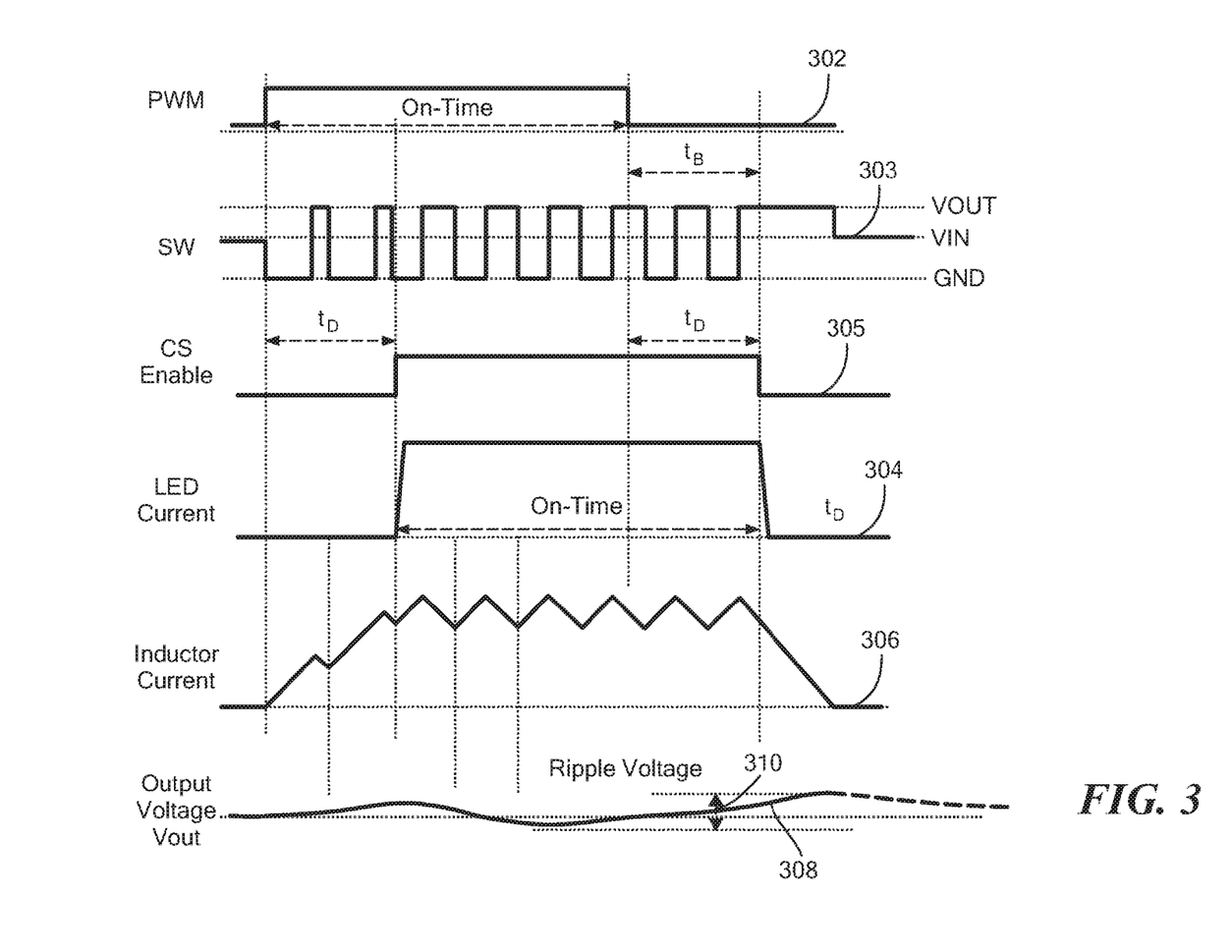
FIG. 3 is a graph depicting waveforms using the time delay module.

Referring to FIG. 3, with the delay module 28, the LED current waveform 304 is delayed (time shifted) from the input signal PWM waveform 302 by a time delay, $t_D$, which results in an inductor current waveform 306 through the inductor L, which is longer in duration than inductor current 206 in FIG. 2. Thus, the inductor L is able to achieve steady state. With the inductor L, an output voltage, Vout, waveform 308 defines a ripple voltage 310 measured from the valley to the peak of the output voltage waveform 308 that is significantly smaller than the ripple voltage 210 in FIG. 2. The voltage waveform at the node SW is the boost switching waveform 303. Boost switching 303 starts when PWM=H and stays active as long as LED current is on. There is a delay, $t_B$, from the time the PWM waveform 302 turns off until the voltage waveform SW 303 turns off. Typically, $t_B = t_D$.

In other embodiments making $t_B < t_D$ reduces the final bump in voltage in the output voltage 308. That is, the boost switch 303 is turned off one cycle before the LED current sinks, which reduces the "bump" at the very end of the Vout waveform 308 when the inductor energy is dumped to the output capacitor Cout.

In other embodiments, making $t_B > t_D$ increases the final bump in voltage in the output voltage 308. That is, the boost switch 303 is turned off several switching cycles after the LED current sinks, which gives an extra "bump" at the end of the Vout waveform 308 (similar to hysteresis control), in case of high leakage at the output during PWM off time.

The CS_enable signal 305 is used to delay the start of the "on" period of the LED current 408 with respect to the PWM signal 302 by the time delay, $t_D$.

Figure 4:
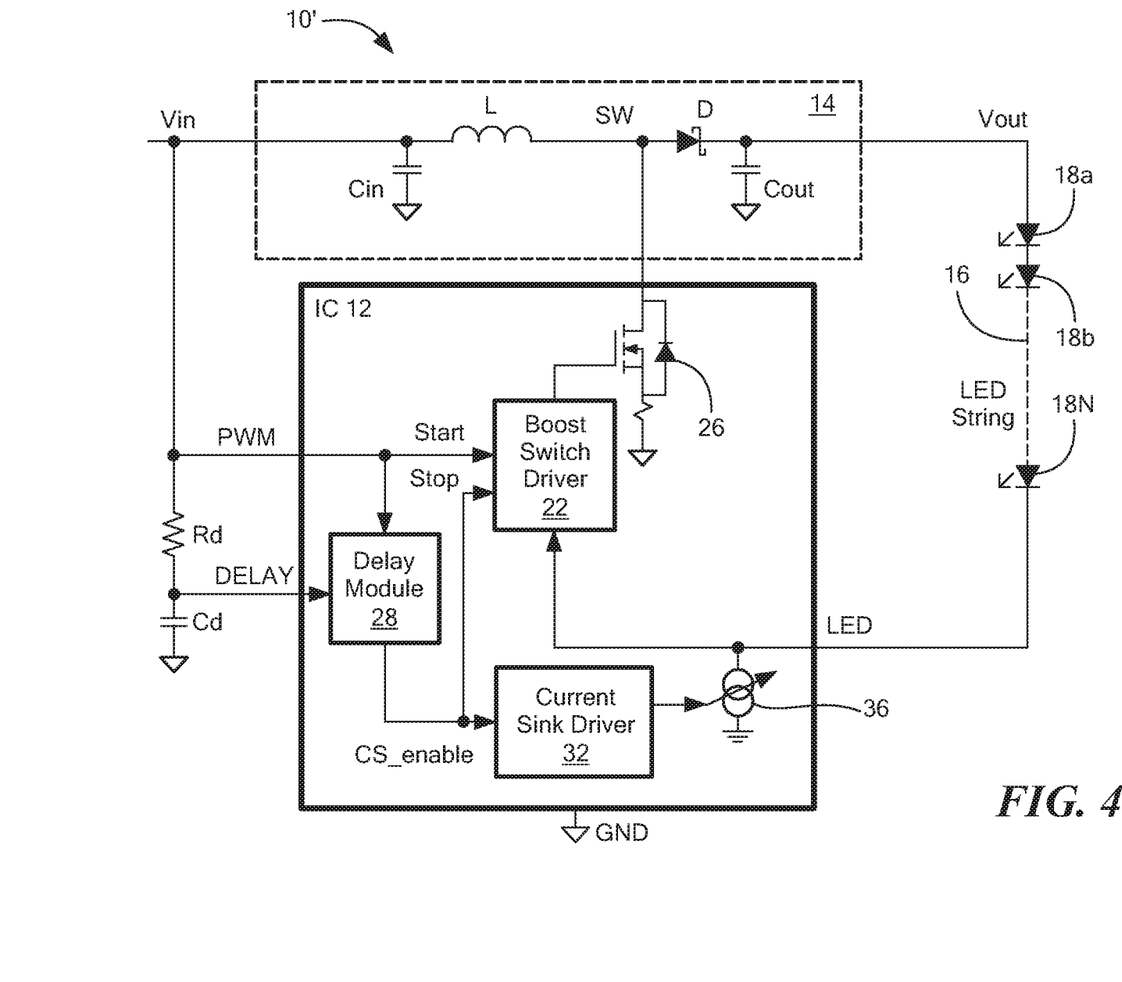
FIG. 4 is a schematic diagram of a particular example of a LED driver system.

Referring to FIG. 4, a circuit 10' is the same as the circuit 10 except a resistor Rd and a capacitor Cd have been added to control the time delay. In one example, a simple equation relating $t_D$ to Vin may be used to control time delay. In one particular example, $t_D = a + b/V_{in}$, which is suitable for analog implementation where $\{a, b\}$ can be programmed by values of resistors connected to ground and Vin, respectively. The time delay, $t_D$, can be adjusted by Rd and Cd.

The time delay may be determined in other ways than the method used in FIG. 4. In one embodiment, the time delay may be a fixed time duration (e.g., 2 microseconds). In another embodiment, the time delay may be determined by a fixed number of switching cycles (e.g. 4 cycles). In other embodiments, a predictive method may be used to determine the time delay. For example, an analytical or empirical equation relating the time delay, $t_D$, to Vin, Vout, inductance L, output capacitance Cout, and other operating parameters. This embodiment is suitable for digital implementation, where a user can store various parameters in internal registers.

In still further embodiments, a reactive method may be used to determine time delay. For example, the voltage across output capacitor Cout is monitored until it exhibits a 'bump' (i.e., increase in voltage) exceeding certain threshold, such as 50 mV, for example.

In even further embodiments, an adaptive method may be used to determine time delay. For example, a 'bump' and 'dip' in output voltage is monitored. The time delay is increased if Vout dips (i.e., drops in voltage) more than it bumps (i.e., increases in voltage) and the time delay is decreased if Vout dips (i.e., drops in voltage) less than it bumps (i.e., increases in voltage).

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. An integrated circuit (IC) configured to receive an input signal comprising:
  a boost switch driver configured to provide a switching operation to a boost converter to drive a string of light emitting diodes (LEDs);
  a current sink driver connected to a current source and configured to provide a current signal to the string of LEDs; and
  a delay module configured to delay the current signal to the string of LEDs with respect to the input signal,
  wherein a resistor and a capacitor, each electrically coupled to the IC, control the delay module delaying the current signal.

2. The IC of claim 1, wherein the input signal is a pulse width modulation (PWM) control signal.

3. The IC of claim 1, wherein the IC further comprises a switch coupled to the boost switch driver.

4. The IC of claim 1, wherein the delay module is configured to provide a delay that is a fixed time delay.

5. The IC of claim 4, wherein the fixed time delay is fixed time duration.

6. The IC of claim 4, wherein the fixed time delay is fixed number of switching cycles.

7. The IC of claim 1, wherein the delay module is configured to provide a delay that is based on a predictive method.

8. The IC of claim 7, wherein the predictive method is based on an input signal of the boost converter, an output voltage of the boost converter, an inductance of the boost converter and an output capacitance of the boost converter.

9. The IC of claim 1, wherein the delay reduces an output ripple of the boot converter.

10. The IC of claim 1, wherein the delay enables the boost converter to achieve a higher LED dimming ratio.

11. An integrated circuit (IC) configured to receive an input signal comprising:
- a boost switch driver configured to provide a switching operation to a boost converter to drive a string of light emitting diodes (LEDs);
- a current sink driver connected to a current source and configured to provide a current signal to the string of LEDs; and
- a delay module configured to delay the current signal to the string of LEDs with respect to the input signal,
- wherein the delay module is configured to provide a delay that is based on a reactive method.

12. The IC of claim 11, wherein the reactive method is based on a voltage of an output capacitor of the boost converter exceeding a threshold.

13. An integrated circuit (IC) configured to receive an input signal comprising:
- a boost switch driver configured to provide a switching operation to a boost converter to drive a string of light emitting diodes (LEDs);
- a current sink driver connected to a current source and configured to provide a current signal to the string of LEDs; and
- a delay module configured to delay the current signal to the string of LEDs with respect to the input signal,
- wherein the delay module is configured to provide a delay that is based on an adaptive method.

14. The IC of claim 13, wherein the adaptive method is based on an output voltage of the boost converter.

15. An integrated circuit (IC) configured to receive an input signal comprising:
- a boost switch driver configured to provide a switching operation to a boost converter to drive a string of light emitting diodes (LEDs);
- a current sink driver connected to a current source and configured to provide a current signal to the string of LEDs; and
- a delay module configured to delay the current signal to the string of LEDs with respect to the input signal,
- wherein the IC further comprises a switch coupled to the boost switch driver,
- wherein the delay module delays the current signal resulting in an inductor current at the boost converter being activated longer in time.

16. The IC of claim 15, wherein a resistor and a capacitor, each electrically coupled to the IC, control the delay module delaying the current signal.

17. The IC of claim 15, wherein the input signal is a pulse width modulation (PWM) control signal.

18. The IC of claim 15, wherein the delay module is configured to provide a delay that is a fixed time delay.

19. The IC of claim 15, wherein the delay reduces an output ripple of the boot converter.

20. The IC of claim 15, wherein the delay enables the boost converter to achieve a higher LED dimming ratio.

* * * * *

UNITED STATES PATENT AND TRADEMARK OFFICE
CERTIFICATE OF CORRECTION

PATENT NO.         : 9,642,203 B2
APPLICATION NO.    : 15/175117
DATED              : May 2, 2017
INVENTOR(S)        : Nai-Chi Lee et al.

It is certified that error appears in the above-identified patent and that said Letters Patent is hereby corrected as shown below:

On the Title Page

Delete the title page and substitute therefore with the attached title page consisting of the corrected illustrative figure.

In the Drawings

Please replace FIG. 4 with FIG. 4 as shown on the attached page.

Signed and Sealed this
Eleventh Day of July, 2017

Joseph Matal
*Performing the Functions and Duties of the
Under Secretary of Commerce for Intellectual Property and
Director of the United States Patent and Trademark Office*

United States Patent
Lee et al.

(10) Patent No.: US 9,642,203 B2
(45) Date of Patent: May 2, 2017

(54) CONTROLLING DIMMING RATIO AND OUTPUT RIPPLE VOLTAGE (71) Applicant: Allegro Microsystems, LLC, Worcester, MA (US)

(72) Inventors: Nai-Chi Lee, Nashua, NH (US); Pranav Raval, Nashua, NH (US)

(73) Assignee: Allegro Microsystems, LLC, Worcester, MA (US)

(*) Notice: Subject to any disclaimer, the term of this patent is extended or adjusted under 35 U.S.C. 154(b) by 0 days.

(21) Appl. No.: 15/175,117

(22) Filed: Jun. 7, 2016

(65) Prior Publication Data
US 2016/0366742 A1 Dec. 15, 2016

Related U.S. Application Data

(60) Provisional application No. 62/174,847, filed on Jun. 12, 2015.

(51) Int. Cl.
H05B 37/02 (2006.01)
H05B 33/08 (2006.01)

(52) U.S. Cl.
CPC ...... H05B 33/0845 (2013.01); H05B 33/083 (2013.01); H05B 33/0815 (2013.01)

(58) Field of Classification Search
CPC .. H05B 37/02; H05B 33/0815; H05B 33/083; H05B 37/0281
USPC .................................................. 315/291
See application file for complete search history.

(56) References Cited

U.S. PATENT DOCUMENTS

| 6,982,527 | B2 | 1/2006 | Lee et al. |
| 7,675,245 | B2 | 3/2010 | Szczeszynski et al. |
| 7,999,487 | B2 | 8/2011 | Szczeszynski |
| 8,169,161 | B2 | 5/2012 | Szczeszynski et al. |
| 8,274,238 | B2 | 9/2012 | Szczeszynski et al. |
| 8,339,049 | B2 | 12/2012 | Kang et al. |
| 8,456,105 | B2 | 6/2013 | Wang et al. |
| 8,482,225 | B2 | 7/2013 | Szczeszynski |
| 8,519,636 | B2 | 8/2013 | Wang et al. |
| 8,664,930 | B2 | 3/2014 | Kang et al. |
| 8,742,682 | B1 | 6/2014 | Wang et al. |
| 8,901,835 | B2 | 12/2014 | Kang et al. |

(Continued)

FOREIGN PATENT DOCUMENTS

EP 2 760 255 A1 7/2013
WO WO 2008/086050 A2 7/2008

(Continued)

OTHER PUBLICATIONS

Office Action dated Sep. 1, 2016 for U.S. Appl. No. 14/613,306; 9 pages.

(Continued)

Primary Examiner — Don Le
(74) Attorney, Agent, or Firm — Daly, Crowley, Mofford & Durkee, LLP (57) ABSTRACT

In one aspect, an integrated circuit (IC) is configured to receive an input signal. The IC includes a boost switch driver configured to provide a switching operation to a boost converter to drive a string of light emitting diodes (LEDs), a current sink driver connected to a current source and configured to provide a current signal to the string of LEDs, and a delay module configured to delay the current signal to the string of LEDs with respect to the input signal.

20 Claims, 4 Drawing Sheets

FIG. 4